RECORD STORING AND EJECTING MECHANISM FOR PHONOGRAPHS

Filed Oct. 18, 1949

RALPH A. MULLANEY
*INVENTOR.*

BY Francis W. Crotty
HIS ATTORNEY

Patented Sept. 15, 1953

2,652,257

UNITED STATES PATENT OFFICE 2,652,257

RECORD STORING AND EJECTING MECHANISM FOR PHONOGRAPHS

Ralph A. Mullaney, Chicago, Ill., assignor to Zenith Radio Corporation, a corporation of Illinois Application October 18, 1949, Serial No. 121,973

4 Claims. (Cl. 274—10)

This invention relates to an improved record storing and ejecting mechanism for a phonograph and more particularly to such a mechanism utilizing a spindle of the center-drop type. As used throughout the specification, the term "center-drop" spindle refers to an arrangement wherein a record ejecting mechanism is contained within a central spindle of an automatic phonograph.

Presently existing record discs are of 10 or 12 inch diameter and are provided with a centering aperture having a diameter of substantially 0.281 inch. These records are designed to be played on a turntable having a centering spindle approximately 0.275 inch in diameter. For automatic playing of a group of these records, a common type of record storing and ejecting system utilizes at least one side post within which a record ejecting mechanism is disposed. Such equipment is generally satisfactory to accommodate both the 10 or 12 inch discs. However, record discs having a diameter of 7 inches have now become available and the conventional side post type of record changer must be modified to provide means for supporting and ejecting record discs at three different distances from the spindle if it is to accommodate all three sizes of records. It is at once apparent that the side post system is of limited utility for the three disc sizes, and most particularly if intermix playing is desired.

Inasmuch as each of the three types of records under consideration has a 0.281 inch centering aperture, it is reasonable to conclude that a center-drop spindle can provide intermix playing of the several record sizes. In this system no side post ejecting elements are employed and the record stack is supported or stored on the spindle proper. If a spindle of the offset type is employed, the stack may be held in position by a record stack leveling arm which bears upon the topmost record disc.

The limitation of 0.275 inch for the diameter of the center-drop spindle has heretofore imposed a great mechanical handicap on the equipment as will be apparent from the following description of a prior center-drop-spindle record storing and ejecting mechanism. The prior structure comprises a central spindle having a hollow lower section extending through the turntable and an upper section that is integral with but offset with respect to the lower section. Both sections have an external diameter of the order of 0.275 inch so that the centering aperture of a record disc may fit thereover. Within the lower section there is rotatably supported a shaft to be connected to the record changing drive mechanism and this shaft carries a large radial cam or ejector finger extending slightly beyond the spindle offset to enter into the centering aperture of the lowermost record of a stack supported conjointly by the upper spindle section and by the offset. In operation, the cam shaft is rotated to bring the ejector finger directly under the upper spindle section. The stack then rests upon the spindle offset and the ejector finger is within the center aperture of the bottom disc. Rotation of the cam shaft causes the ejector finger to move out from under the upper section and slide the bottom record over the offset so that it drops onto the turntable. When the ejector is returned to its position beneath the upper section, the record changing function may be repeated.

The described structure has certain pronounced disadvantages which severely limit practical use. In the first place, the entire record stack bears directly and only upon the ejector finger when the latter moves from the ejecting position to its hiding place beneath the upper spindle section. As a consequence, the ejector finger is pressed hard against the lowest record and may seriously groove it during this portion of the record-changing cycle. Continuous wear of that type encountered in successive playing of the record may destroy it in the area adjacent the centering aperture.

Moreover, the offset of the spindle is of the order of one-sixteenth inch and that is wholly inadequate to support the records when it is noted that the centering aperture tends to become enlarged with use. Also, this limited supporting shelf hardly allows for variations in manufacturing tolerances of the records.

Additionally, it is necessary to under cut the upper spindle sufficiently to hide the ejector finger which extends across at least half of the cross section of the cam shaft. This larger amount of under cutting dangerously weakens the spindle at its offset and makes the structure too fragile.

It is an object of this invention, therefore, to provide an improved center-drop spindle for a phonograph which overcomes one or more of the afore-mentioned objections of prior arrangements.

It is a further object of this invention to provide a center-drop spindle which does not subject the records to undue wear.

It is a still further object of this invention to provide a center-drop spindle which is simple in arrangement, is easy to manufacture and assemble and yet is efficiently and entirely reliable in operation.

In accordance with the invention, the record storing and ejecting mechanism for a phonograph comprises a center-drop spindle having an upper section and a vertically restrained offset hollow lower section. The upper section is provided with a cam receiving recess in a portion of the base thereof in alignment with the lower section and a segment of the upper portion of the lower section is cut away to define an arcuate path of travel for a cam from an initial position in which the lowermost record of a stack is supported on said lower section to a terminal position in which the lowermost record of the stack is ejected therefrom. An ejector shaft is rotatably supported within the lower section and a vertically movable ejector cam is mechanically supported by the upper extremity of the shaft and projects into the cut away portion of the lower section to travel between the initial and terminal positions in response to rotational displacement of the shaft. The mechanism further includes a spring which biases the cam upwardly with a force less than the weight of a preselected number of records and a motion-limiting stop which limits the upward travel of the cam beyond the lower section to a distance less than the thickness of one record. A driving motor which is mechanically coupled to the shaft is utilized to rotate the shaft and the cam to effect a record-feeding cycle.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figure 1:
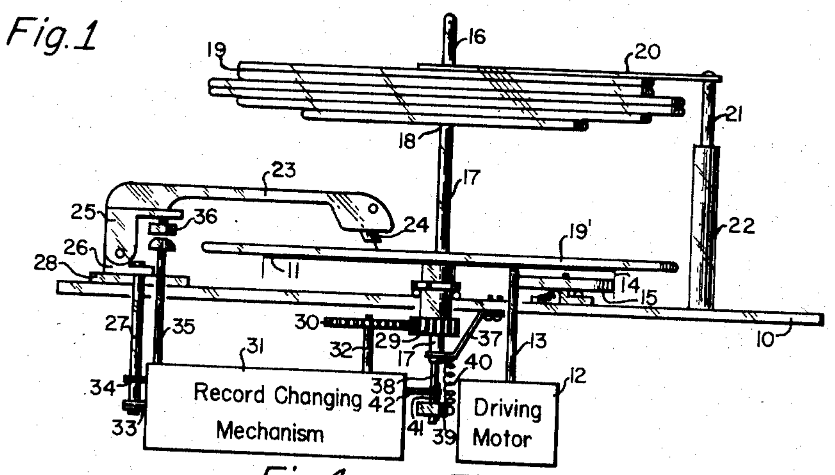
Fig. 1 is a functional representation, partly in block, of a phonograph including a record storing and ejecting mechanism embodying the present invention.

Referring to Fig. 1 of the drawing, the record changer, there shown, includes a mounting base 10 on which a turntable 11 is supported for rotation. A driving motor 12 having a driving shaft 13 is coupled to the inner side of an outer, depending flange or rim 14 by an idler gear 15. Driving motor 12 may be of the synchronous variety and the rotational speed of turntable 11 may be predetermined by the diameters of shaft 13 and flange 14. Although a particular mechanical coupling system has been illustrated it is to be understood that any other form of coupling between motor 12 and turntable 11 may be employed. For example, a multi-speed phonograph drive as disclosed in application Serial No. 89,055, filed on April 22, 1949, now Patent No. 2,584,580, in the name of Maurice E. Hardy and assigned to the same assignee as is this application may be utilized to provide a means for driving turntable 11 at any one of several preselected rotational speeds.

A center-drop spindle for the phonograph extends upwardly from turntable 11 and includes an upper section 16 and an offset hollow lower section 17 coaxially aligned with the turntable. At the offset, a shelf 18 is defined by the upper extremity of section 17. A plurality of record discs of various diameters may be stored in a stack 19, along upper spindle section 16 with the lowermost record resting upon shelf 18. The record-ejecting mechanism embodying the present invention, is associated with spindle 16, 17 and will be described fully hereinafter.

A record stack leveling arm 20 of conventional design bears upon the uppermost record of stack 19 to maintain the stack in position on shelf 18 with the records parallel to the surface of turntable 11. Leveling arm 20 extends to the vicinity of spindle 16, 17 from a rod 21 which is slidably and rotatably supported within a tubular member 22 affixed to base 10 at a distance from spindle 16, 17 greater than one-half the diameter of the largest records to be played. For this arrangement leveling arm 20 is biased downwardly by its own weight and the weight of rod 21. Arm 20 may be rotated in a direction away from spindle 16, 17 to a position such that records may be loaded in the magazine 16, 18 or removed from turntable 11.

A tone arm 23 having a conventional stylus and transducer element 24 affixed to one end is supported for pivotal movement about a horizontal axis by means of a hinge having companion upper and lower portions 25 and 26, upper hinge portion 25 being affixed to the other end of the tone arm 23. Tone arm 23 further is supported for rotation about a vertical axis by means of a vertical shaft 27 affixed at one end to hinge portion 26 which rests upon a bearing block 28 secured to base member 10. Hence, tone arm 23 is supported in a manner whereby the stylus of element 24 is engageable with the grooves of a record disc 19' on turntable 11.

A gear 29, positioned below base 10, is mechanically coupled with turntable 11 to be rotatable therewith. Gear 29 is in driving engagement with a gear 30, in turn, coupled to a record changing mechanism 31 by a shaft 32. This mechanism, which may be of any well known construction, includes means for converting the rotary motion imparted to turntable 11 by driving motor 12 into the various movements necessary to perform a record-changing cycle and its operating details will be explained more fully hereinafter. Record changing mechanism 31 is coupled with shaft 27 by a conventional cam arm 33 and a trip lever 34. Further, mechanism 31 is coupled with one extremity of a tone arm pusher rod 35 which is supported for vertical movement in the vicinity of tone arm 23 with the other extremity thereof in incipient engagement with a projection 36 of upper hinge portion 25.

The spindle section 17 extends downwardly through axial openings (not shown) in turntable 11 and gear 29 and is affixed at the underside of base 10 by a bracket 37. An ejector shaft 38 is rotatably and slidably supported within the lower section 17, extends downwardly therefrom, and has a spring terminal 39 at the lowermost end. A spring 40 is coupled between terminal 39 and bracket 37 to bias shaft 38 in an upward direction. Shaft 38 includes a key portion 41 and the shaft and key portion are slidably disposed within a corresponding opening and key way (not shown) positioned at one end of a crank lever 42 the other end of which is coupled with record changing mechanism 31.

Figures 2, 3, 4, 5, 6, 7, 8, 9, 10:
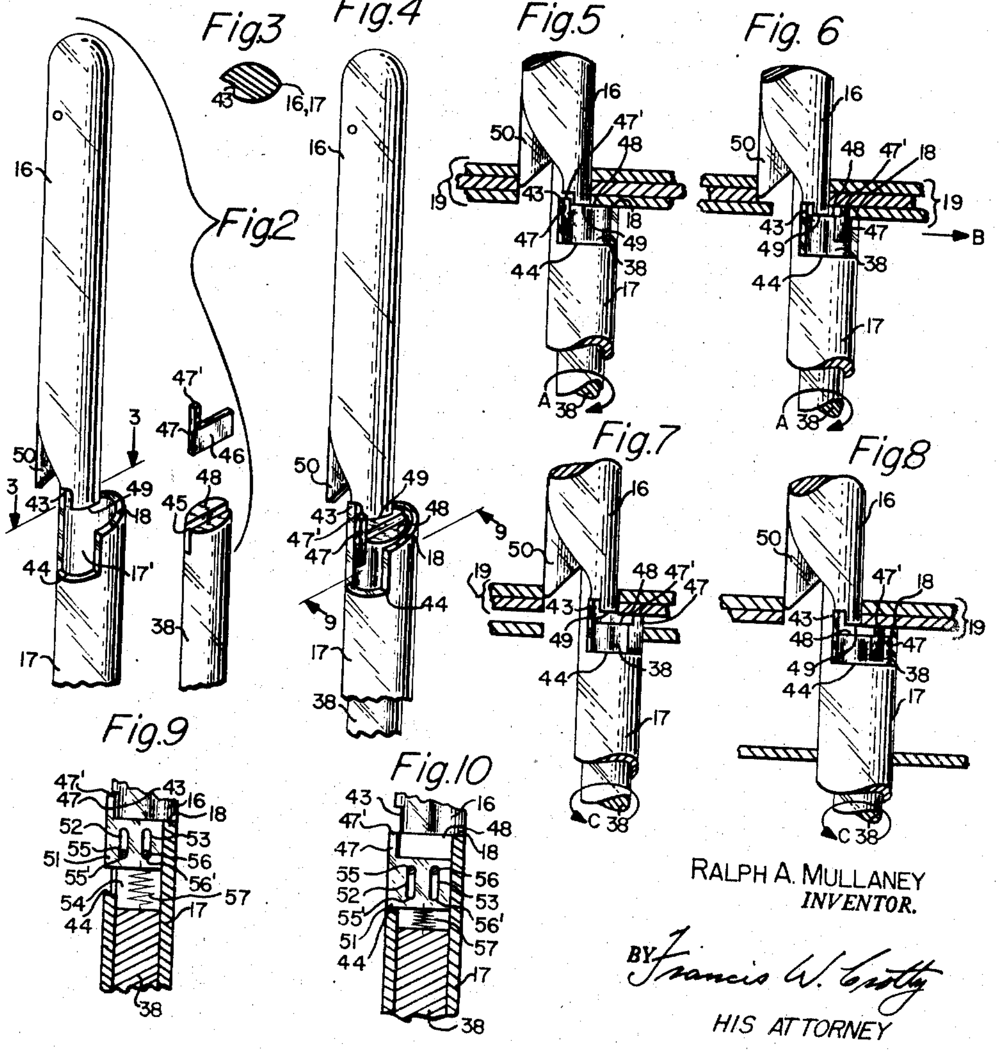
Fig. 2 is an isometric view of a portion of the spindle shown in Fig. 1 in a disassembled condition.
Fig. 3 is a sectional view taken along line 3—3 of Fig. 2.
Fig. 4 shows the spindle of Fig. 2 in an assembled condition.
Figs. 5 through 8 are views of the spindle with several records in position, shown in section, illustrating a record-feeding cycle.
Fig. 9 is a sectional view taken along line 9—9 of Fig. 4 but showing a modified spindle arrangement in one condition of operation; and, Fig. 10 is a sectional view of the modified structure of Fig. 9 in another condition of operation.

Referring now to Fig. 2, the center-drop spindle 16, 17 is shown to include a cam receiving recess 43 provided in a portion of the base of upper section 16 which is in alignment with lower section 17. The recess 43 is illustrated more clearly by Fig. 3. The upper portion of lower section 17 is cut away at 17′ to define an arcuate path of travel 44 for a cam from a record-receiving position within recess 43 to a record-ejecting position.

Ejector shaft 38 is provided with an end slot 45 arranged to receive, by means of a press fit, a leg portion 46 of an L-shaped member the other leg of which defines an ejector cam 47. As shown in Fig. 4, the ejector 47 is supported at the upper extremity 48 of ejector shaft 38 and projects into the cut away portion of lower section 17 to travel between its record-receiving position within recess 43 and its record-ejecting position in response to rotational displacement of shaft 38. Ejector cam 47 is designed to be completely hidden within recess 43 when in its record-receiving position. Furthermore, since shaft 38 is vertically movable within spindle section 17 and the shaft is biased upwardly by spring 40, cam 47 is also vertically movable and is biased upwardly by spring 40. The biasing force exerted by spring 40 on cam 47 is adjusted to be less than the weight of a preselected number of records. This spring force is arranged so that the cam is depressed when the weight of the records in the stack is sufficient to damage the lowermost record if cam 47 courses thereover, as will be explained more fully hereinafter.

A motion-limiting stop abutment 49 which is defined by the lower extremity of upper spindle section 16 is provided for limiting the upward travel of cam 47 by engaging the uppermost extremity 48 of shaft 38. The vertical dimension of ejector cam 47 is arranged together with the position of stop abutment 49 to limit the upward travel of the upper tip 47′ of cam 47, beyond shelf 18 of lower section 17, to a distance less than the thickness of one record. This assures that the ejector cam 47 operates only on one record disc during a single record-feeding cycle.

As has been pointed out, the ejector cam portion of L-shaped member 46, 47 extends from the outer periphery of shaft 38 to project into the cut away portion 17′ of lower spindle section 17. Since spindle sections 16 and 17 may have a diameter of the order of 0.275 inch (approaching the center opening of the records), ejector 47 may not extend appreciably in a horizontal direction beyond the outer wall of lower section 17. Preferably, the ejector cam 47 is a pin having a diameter approximately equal to the wall thickness of spindle section 17.

The driving motor 12 which is coupled to turntable 11 is also coupled to record changing mechanism 31 as stated above. Furthermore, since record changing mechanism 31 is coupled with shaft 38, the driving motor is utilized to oscillate the shaft and cam 47 to effect a record-feeding cycle.

The upper portion 16 of spindle 16, 17 is provided with a conventional deflectable gate element 50. When records are carried from section 17 to section 16 of the spindle, to remove them from the turntable 11, the element 50 is deflected into the spindle by the records to a position wherein a smooth contour is provided along the lower portion of spindle 16. This arrangement is generally well known and the prime purpose of the gate is to engage and prevent movement of the penultimate record while the lowermost record is being horizontally displaced during a record-changing cycle.

In describing a record-feeding cycle, let it be assumed that stylus 24 of tone arm 23 is tracking in the groove of record 19′ being rotated by turntable 11. When the stylus reaches the eccentric portion of the record groove, reverse movement of the tone arm is imparted by trip arm 34 to a trip mechanism (not shown) of record changing mechanism 31. It is to be understood that any well known form of trip mechanism may be incorporated in record changing mechanism 31 including those responsive to velocity change or position of tone arm 23. Whatever the type employed, this portion of the record changing mechanism is utilized to actuate a conventional clutch (not shown), also contained within the changing mechanism, for completing a driving connection between shaft 32 and the various elements of the system.

The rotational movement of shaft 32, which is driven by motor 12 is converted to vertical motion to displace rod 35 upwardly whereupon it engages projection 36 to pivot tone arm 23 about the horizontal axis of hinge 25, 26 and stylus 24 is carried from engagement with the groove of disc 19′. Next, movement is imparted to cam arm 33 to rotate shaft 27 and carry tone arm 23 outwardly from the center of record 19′ beyond the outer periphery, thereof.

The driving force of motor 12 then is transferred to crank lever 42 and shaft 38 is rotated in a first direction designated by arrow A of Fig. 5, displacing cam 47 from recess 43 and along its arcuate path of travel 44. Since spring 40 biases shaft 38 against abutment 49, the ejector cam 47 extends upwardly from shelf 18 and engages the aperture defining surface of the lowermost record disc of stack 19 to displace this disc in a direction indicated by arrow B of Fig. 6. At the same time, gate 50 prevents the penultimate record of stack 19 from moving in this horizontal direction. Movement of shaft 38 continues in the direction of arrow A until cam 47 reaches a position slightly beyond a record-ejecting position. The lowermost record previously aligned with spindle section 16, is aligned with section 17 when cam 47 is in a record ejecting position and the record descends of its own weight toward turntable 11.

The remaining records of stack 19 now bear against the uppermost tip 47′ of ejector cam 47 and these records together have sufficient weight to overcome the force of spring 40. Cam 47 and shaft 38 are displaced downwardly until the records are borne by shelf 18. At the same time, shaft 38 is rotated in a direction opposite to that of arrow A as indicated by arrow C of Fig. 7 with the lower portion of the cam 47 traveling along the arcuate path 44 in the cut away 17′ of lower spindle section 17 through the position shown in Fig. 8 with the record stack supported by shelf 18. When cam 47 reaches a position within the surface defined by the cylinder of upper spindle section 16, the record stack no longer bears upon its top portion 47′ since the centering apertures of the record discs are aligned with this spindle section. The bias of spring 40 thereupon urges shaft 38 upwardly to carry cam 47 to its initial position within recess 43 as shown in Fig. 5.

The record which has been discharged or ejected descends along spindle section 17 until it rests atop record disc 19'. The sequence of operation is so timed that after the record has been deposited, arm 33 is rotated to carry tone arm 23 to a position wherein stylus 24 is above the starting groove of the new record and rod 35 is lowered to allow arm 23 to drop and stylus 24 engages the groove of the new record. The cycle thus is completed and the afore-described sequence is again performed when stylus 24 tracks in the eccentric groove of the new record. Although no record-diameter discriminator element has been illustrated, it is to be understood that such an element may be employed with mechanism 31 in order that the tone arm be properly positioned above the starting groove of a newly ejected record disc, of any one of the three diameters (viz 7, 10 or 12 inches).

Inasmuch as cam 47 is biased upwardly with a force determined by spring 40, the tension of the spring may be so adjusted that when the weight of the records upon the ejector cam 47 is of a predetermined value the cam is displaced to the level of shelf 18. It is apparent that the lowermost disc may be contacted by the relatively small area of the tip 47' of cam 47 during the return portion of the cycle shown in Figs. 7 and 8. However, spring 40 is sufficiently weak so that if the weight of the records is great enough to cause any appreciable wear to the lowermost one, the cam is depressed and the stack is supported by shelf 18. In a preferred embodiment, the cam is depressed to the level of shelf 18 by the weight of one 10 inch record disc.

From Fig. 2 it may be seen that the entire spindle assembly is easily fabricated. Shaft 38 may be formed from standard rod stock material and spindle section 17 may be fashioned from stock tubing material since close machine tolerances are not required between shaft 38 and the hollow portion of lower spindle section 17. At the upper extremity of shaft 38, slot 45 is machined by any well known method, milling for example. L-shaped member 46, 47 may be constructed from sheet stock by a conventional stamping method. In assemblying the structure, shaft 38 is inserted at the lower extremity of section 17 and placed in a position approximately abutting stop 49. The shaft is rotated until slot 45 is clear of the abutment shoulder and L-shaped member 46, 47 is pressed into slot 45 in a well known manner.

The mechanical arrangement of the invention is such that no fragile elements are employed. In Fig. 4 it may be seen that ejector shaft 38 may have a diameter which approaches that of spindle section 17. The shaft, therefore, is mechanically rugged and the end slot 45 therein, being small compared with the shaft diameter, weakens the structure little, if at all. The cam member 46, 47 is also rugged by the nature of its L-shaped configuration. Further, as seen in Fig. 3, recess 43 of spindle 16, 17 is a substantially small proportion of the cross sectional area thereof. Thus, the recess does not materially weaken the spindle structure and the fragile spindle of the afore-described prior structure is overcome.

It follows then that the arrangement of Figs. 1 through 4 affords a record storing and ejecting mechanism for a phonograph including a mechanically rugged center-drop spindle which is easily manufactured. In addition, the mechanism is such that record discs are not subject to undue wear or damage.

A modification of the spindle and ejector structure is shown in Fig. 9. The modified spindle is similar to that of Fig. 4 and corresponding elements are designated by identical reference numerals. In this arrangement, shaft 38 is longitudinally fixed relative to spindle section 17 and in place of spring terminal 39 and spring 40, a thrust bearing (not shown) is affixed to bracket 37 and supports shaft 38 at the lower extremity thereof. Ejector cam 47 is an integral part of an L member having a leg similar to leg 46 of the cam shown in Fig. 2, but considerably higher in the direction of shaft 38 to accommodate a pair of vertical slots 52 and 53. A slot 54 is provided in shaft 38, somewhat deeper than the slot 45 of the shaft shown in Fig. 2 and member 47, 51 is supported for vertical movement relative to the shaft by a pair of pins 55 and 56 which pass through shaft 38. A spring 57 coupled between shaft 38, at the bottom of slot 54, and the leg portion 51 of the L member biases member 47, 51 upwardly, movement thereof being restricted by the lowermost extremities 55' and 56' of slots 52 and 53, respectively. In this position, cam 47 and shaft 38 are related in a manner generally similar to that shown in the spindle of Fig. 4.

The operation of the modified structure is similar to that described in connection with the preferred embodiment and the cyclic sequence shown by Figs. 5 through 8 follows. The operation is exactly as portrayed in Figs. 5 and 6 in one phase of the record-feeding cycle. However, in the phase of operation shown by Fig. 7, instead of the remaining records of stack 19 causing cam 47 and shaft 38 to be depressed, since the shaft is longitudinally fixed relative to spindle section 17, the weight of the record stack depresses cam 47 relative to shaft 38 and against the bias of spring 57. The operating cycle continues with the ejector cam 47 substantially in the positions shown in Figs. 7 and 8 and at the end of the cycle, spring 57 urges member 47, 51 upwardly to place ejector cam 47 in its record-receiving position within recess 43.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A record storing and ejecting mechanism for a phonograph comprising: a center drop spindle having an upper section and a vertically restrained, offset, hollow lower section, said upper section being provided with a cam-receiving recess in a portion of the base thereof in alignment with said lower section, and a segment of the upper portion of said lower section being cut away to define an arcuate path of travel for a cam from an initial position in which the lowermost record of a stack is supported on said lower section to a terminal position in which said lowermost record of said stack is ejected from said stack; an ejector shaft rotatably supported within said lower section; a vertically movable ejector cam mechanically supported by the upper extremity of said shaft and projecting into the cut-away portion of said lower section to travel between said initial and terminal positions in response to rotational displacement of said shaft;

a spring, biasing said cam upwardly with a force less than the weight of a preselected number of records; a motion-limiting stop for limiting the upward travel of said cam to a distance less than the thickness of one record; and a driving motor mechanically coupled to said shaft to rotate it and said cam to effect a record feeding cycle.

2. A record storing and ejecting mechanism for a phonograph, comprising: a center drop spindle having an upper section and a vertically restrained, offset, hollow lower section, said upper section being provided with a cam-receiving recess in a portion of the base thereof in alignment with said lower section, and a segment of the upper portion of said lower section being cut away to define an arcuate path of travel from an initial position in which the lowermost record of a stack is supported on said lower section to a terminal position in which said lowermost record of said stack is ejected from said stack; an ejector shaft rotatably and slidably supported within said lower section; a vertically movable ejector cam mechanically supported by the upper extremity of said shaft and projecting into the cut-away portion of said lower section to travel between said initial and terminal positions in response to rotational displacement of said shaft; a spring coupled to said shaft to bias said cam upwardly with a force less than the weight of a preselected number of records; a motion-limiting stop for limiting the upward travel of said shaft to a distance less than the thickness of one record; and a driving motor mechanically coupled to said shaft to rotate it and said cam to effect a record feeding cycle.

3. A record storing and ejecting mechanism for a phonograph, comprising: a center drop spindle having an upper section and a vertically restrained, offset, hollow lower section, said upper section being provided with a cam-receiving recess in a portion of the base thereof in alignment with said lower section, and a segment of the upper portion of said lower section being cut away to define an arcuate path of travel for a cam from an initial position in which the lowermost record of a stack is supported on said lower section to a terminal position in which said lowermost record of said stack is ejected from said stack; an ejector shaft rotatably supported within said lower section; a vertically movable ejector pin mechanically supported by the upper extremity of said shaft and projecting into the cut-away portion of said lower section to travel between said initial and terminal positions in response to rotational displacement of said shaft, and having a diameter of the order of the wall thickness of said lower section; a spring, biasing said cam upwardly with a force less than the weight of a preselected number of records; a motion-limiting stop for limiting the upward travel of said pin to a distance less than the thickness of one record; and a driving motor mechanically coupled to said shaft to rotate it and said pin to effect a record feeding cycle.

4. A record storing and ejecting mechanism for a phonograph, comprising: a center drop spindle having an upper section and a vertically restrained, offset, hollow lower section, said upper section being provided with a cam-receiving recess in a portion of the base thereof in alignment with said lower section, and a segment of the upper portion of said lower section being cut away to define an arcuate path of travel for a cam from an initial position in which the lowermost record of a stack is supported on said lower section to a terminal position in which said lowermost record of said stack is ejected from said stack; an ejector shaft rotatably and slidably supported within said lower section; a vertically movable ejector cam mechanically supported by the upper extremity of said shaft and projecting into the cut-away portion of said lower section to travel between said initial and terminal positions in response to rotational displacement of said shaft, and having a maximum dimension in a direction transverse to said spindle no greater than the wall thickness of said lower section; a spring coupled to said shaft to bias said cam upwardly with a force less than the weight of a preselected number of records; a motion-limiting stop for limiting the upward travel of said shaft to a distance less than the thickness of one record; and a driving motor mechanically coupled to said shaft to rotate it and said cam to effect a record feeding cycle.

RALPH A. MULLANEY.

References Cited in the file of this patent

UNITED STATES PATENTS

| Number | Name | Date |
|---|---|---|
| 2,235,693 | Wells | Mar. 18, 1941 |
| 2,523,045 | Miller et al. | Sept. 19, 1950 |

FOREIGN PATENTS

| Number | Country | Date |
|---|---|---|
| 552,546 | Great Britain | Apr. 13, 1943 |
| 110,303 | Sweden | Apr. 11, 1944 |